(No Model.)
J. F. NORMOYLE.
PIPE COUPLING.
No. 592,820. Patented Nov. 2, 1897.
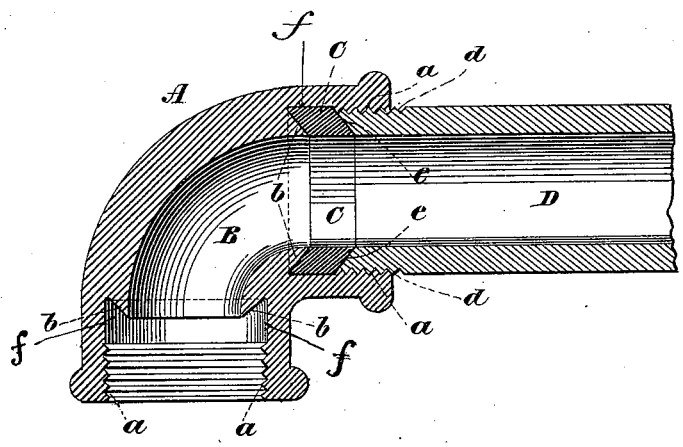

UNITED STATES PATENT OFFICE.

JOHN F. NORMOYLE, OF NEW YORK, N. Y., ASSIGNOR OF ONE-HALF TO HENRY J. BAACK, OF SAME PLACE.

PIPE-COUPLING.

SPECIFICATION forming part of Letters Patent No. 592,820, dated November 2, 1897.

Application filed March 31, 1897. Serial No. 630,034. (No model.)

*To all whom it may concern:*

Be it known that I, JOHN F. NORMOYLE, a citizen of the United States, residing at New York, in the county of New York and State of New York, have invented certain new and useful Improvements in Pipe-Couplings; and I do declare the following to be a full, clear, and exact description of the invention, such as will enable others skilled in the art to which it appertains to make and use the same, reference being had to the accompanying drawing, and to the letters of reference marked thereon, which forms a part of this specification.

The invention relates to improvements in pipe-couplings; and it consists in the novel combination of features hereinafter described, and particularly pointed out in the claims.

The object of the invention is to produce a perfectly convenient and secure means for coupling together pieces of pipe and insuring the formation of absolutely-tight joints capable of preventing the leakage through them of ammonia or other gas or fluid as well as liquids.

My invention will be understood from the following description, taken in connection with the accompanying drawing, which represents a central vertical longitudinal section through a coupling embodying my invention.

In the drawing, A designates the coupling proper as being in the form of an elbow, but it is obvious that it may be straight or of T or other shape. The device A is a sleeve internally threaded at its opposite ends, as at $a\,a$, and having between its threaded portions the integral inner annular band B, whose bore corresponds with the bore of the pipes to be connected together, and whose ends constitute the inwardly-beveled shoulders $b\,b$, against each of which is placed the soft-metal washer C. The ends of the pieces of pipe D to be connected by the coupling-sleeve A are threaded, as at $d$, to engage the threads $a$ of said sleeve, and are beveled, as at $e$, to correspond and become parallel with the beveled shoulders $b$ of said sleeve.

In securing the parts together the washers C will first be inserted within the sleeve A and against the beveled shoulders $b$, and thereupon the pipe D will be screwed firmly into said sleeve and against said washers C, driving the latter firmly against the shoulders $b$ by the pressure against the washers of the beveled ends $e$ of said pipe.

The beveled end $e$ of the piece of pipe D furnishes an extended bearing-surface for pressing against the washer C, and said beveled end $e$, being parallel with the beveled shoulder $b$, insures a uniform pressure over the side surfaces of said washer and the formation of a tight joint.

Between the threads $a$ and the shoulders $b$ are formed annular recesses $f$, which receive the washers C and coöperate with the said shoulders and the beveled ends $e$ to form a construction rendering it convenient to secure tight joints.

What I claim as my invention, and desire to secure by Letters Patent, is—

1. The coupling-sleeve A having the end screw-threads $a$ and inwardly-beveled shoulder $b$ whose inner annular edge joins the inner surface of said sleeve, combined with the washer C against said shoulder and having a central opening corresponding with the bore of said sleeve, and the threaded pipe D having the beveled end $e$ for contact with said washer and corresponding with the bevel of said shoulder $b$, the said pipe having a uniform bore corresponding with the bore of said sleeve and said bevel $e$ extending entirely across the end edges of said pipe from the inner to the outer surfaces thereof; the whole being substantially as shown and described.

2. The coupling-sleeve A having the end screw-threads $a, a$, recesses $f, f$, and inwardly-beveled shoulders $b, b$, said shoulders extending from the outer edges of said recesses to the surface of the bore of said sleeve, combined with the soft-metal washers C in said recesses and against said shoulders and having central openings corresponding with the bore of said sleeve, and the threaded pipe D having the beveled end $e$ for contact with said washer and corresponding with the bevel of said shoulders $b$, said bevel $e$ extending entirely across the end edges of said pipe from the inner to the outer surfaces thereof, the whole being substantially as shown and described.

In testimony whereof I affix my signature in presence of two witnesses.

JOHN F. NORMOYLE.

Witnesses:
 CHAS. C. GILL,
 E. JOS. BELKNAP.